July 12, 1966 F. E. SANBORN 3,260,139
SELF-CLEARING DRILL
Filed Aug. 7, 1963
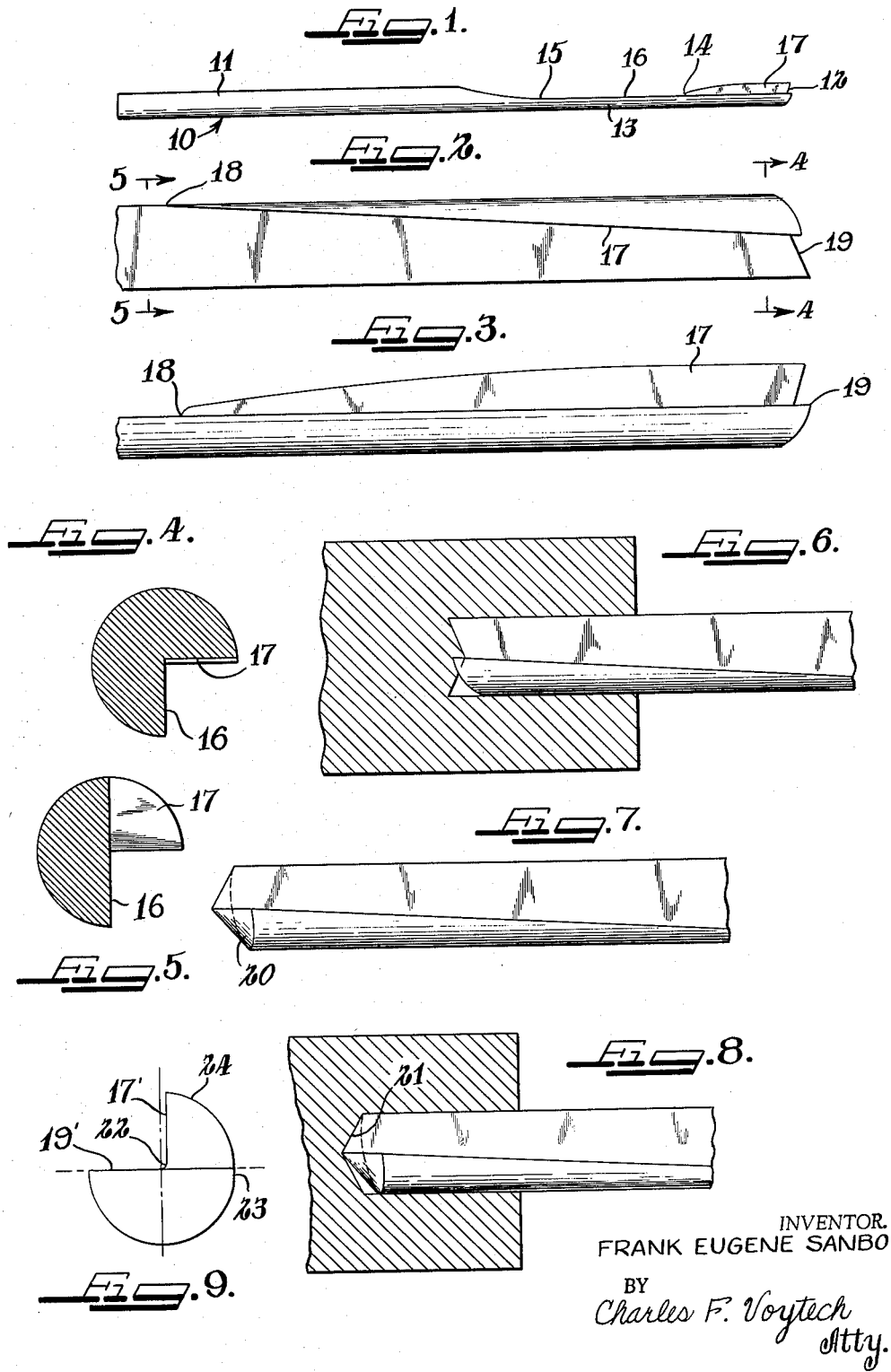
INVENTOR.
FRANK EUGENE SANBORN
BY
Charles F. Voytech
Atty.

United States Patent Office 3,260,139
Patented July 12, 1966

3,260,139
SELF-CLEARING DRILL
Frank Eugene Sanborn, 2700 Glenview Ave.,
Park Ridge, Ill.
Filed Aug. 7, 1963, Ser. No. 300,545
7 Claims. (Cl. 77—67)

This invention relates to drills for making precision deep holes in metal or the like.

One of the problems encountered in drilling deep holes, that is to say, a hole which is more than three diameters of the drill deep, is the interference caused by the chips made by the drill as it cuts the metal. In the normal twist drill the chips will accumulate at the bottom of the hole and eventually will pack in the flutes down to the cutting edge and thus render the edge useless. When this occurs it is necessary to back the drill out of the hole, clear the flutes, and then resume the drilling operation.

One solution to the problem of chip removal which has been used successfully is that of forcing a lubricant into the drilled hole to the cutting edge of the drill so that as the chips are formed, they are forced out of the hole along the flutings of the drill. An example of such drills is a gun drill which is essentially a round rod with a quarter section removed, and with an oil hole running the length of the drill in the remaining solid portion of the drill through which the oil under pressure is fed to the bottom of the hole, thus creating an upward pressure upon the chips to force them out of the hole. The quarter section removed is not twisted but runs axially through the operative portion of the drill. It is difficult, however, to use this method of removing chips in a small drill, particularly where the diameters of the drills are less than 1/8″, since the oil hole would then become impractically small.

It is an object of this invention to provide a drill bit for drilling deep holes which will be self clearing with respect to chips created by the drill bit, so that the need for oil under pressure to force out the chips, or for periodic and frequent removals of the drill bit from the hole to clear the bit is eliminated.

As a further object, this invention has within its purview the provision of a drill bit for drilling small, deep holes, efficiently and quickly, which will be self clearing as to chips created at the bottom of the hole during the drilling operation but which is simple to make and maintain in good working order.

I have found that the foregoing objectives may be achieved by so forming the drill bit that the volume of the opening formed by the flute provided for the chips is made progressively larger from the operative point of the bit toward the shank end thereof. This precludes packing of the chips in the flute so that the normal pressure upon the chips developed by the drilling operation is sufficient to produce a continuous movement of the chips out of the hole. The manner in which this principle is applied to a specific drill bit is illustrated in the accompanying drawing wherein:

FIG. 1 is a side elevational view of a drill bit made in accordance with this invention;

FIG. 2 is a plan view on an enlarged scale of the operative end of the bit of FIG. 1;

FIG. 3 is a side elevational view of the drill bit end shown in FIG. 2;

FIG. 4 is an enlarged cross section of the drill bit of FIG. 2, the section being taken along line 4—4 thereof;

FIG. 5 is an enlarged cross section of the drill bit of FIG. 2, the section being taken along line 5—5 thereof;

FIG. 6 is a plan view of the bit of FIG. 2, showing it in operation in a hole;

FIG. 7 is a plan view of a drill bit made in accordance with this invention, but with its tip ground to provide progressive clearance for its cutting edge;

FIG. 8 is a view similar to FIG. 6 showing the drill bit of FIG. 7 in operation; and FIG. 9 is an end view of a modification of the bit of FIG. 2.

Referring now to the drawings for a detailed description of the illustrative embodiments shown therein, the drill bit of FIG. 1 is comprised of a section of round rod 10 having a round shank 11 for attachment to a drill head, a flat-ground operative end 12, and an intermediate section 13 which, from a point 14 near the flat ground end 12 to a point 15 toward the shank 11, has been ground to remove one-half of the rod, leaving a half section with a flat surface 16 thereon. From point 15 the half section changes gradually to the round section at the shank 11. At the flat-ground operative end 12 the section as shown in FIG. 4 is a three-quarter section, that is, a round section from which a quarter section has been ground away. Between the intermediate section 13 and the end 12 flat surface 16 continues to end 12 and forms therewith a cutting edge 19.

Wall 17, which defines a portion of the quarter section removed, is, of course, perpendicular to surface 16 in the form chosen to illustrate this invention, and said wall continues in its perpendicular relation to surface 16 at an angle to the general longitudinal axis of the drill until it intersects the corner 18 formed by the intersection of flat surface 16 and the said cylindrical outer surface of the bit. The axial length of wall 17 is preferably substantially the same as, or slightly greater than the depth of the hole to be drilled. The length of said wall, however, is determined by the diameter of the drill bit and the angle desired between said wall and the axis of the drill bit to produce the desired chip clearing action. Thus, the length of wall 17 may be less than the depth of the hole being drilled, so long as the angle of the wall 17 to the drill bit axis is such as to prevent packing of the chips in the hole.

A very simple way to produce the drill form described above is to mount a round drill blank in a carriage on a grinder with the axis of the blank parallel with the bed of the grinder but at an angle with the direction of movement of the carriage, and then grind a flute in the blank which commences on one side of the blank axis and then widens to extend across the entire blank. The depth of the flute is equal to the radius of the blank. This leaves a continuous flat surface 16 formed by the face of the grinder and a perpendicular wall 17 formed by the side of the grinder.

For purposes of illustration, surface 17 has been shown as being perpendicular with reference to surface 16, but it is not necessary for the successful operation of the drill bit of this invention that this relationship exist. Said wall 17 may be disposed at a different angle to surface 16, either obtuse or acute, it being important only that said wall at the operative end 12 terminate on the axis of the bit so that the operative cutting edge 19 extends from the axis of the bit to the outer cylindrical wall thereof. Wall 17 is also shown as a flat surface, but for the purposes of this invention it may be a convex surface, so that it intersects the corner formed by the intersection of surface 17 with the round outer surface of the bit at a point closer to the operative end 12 of the bit. It is important, however, that the volume of the material removed from the original round rod becomes progressively larger from the operative end 12 to the half section 13. The reason for this progressive increase in volume is that it is desirable to form an expanding chamber with the wall of the hole drilled by the bit into which the chips may flow. This eliminates wedging or packing of the chips in the flutes and promotes a continuous flow of chips out of the hole.

It is contemplated that drill bits of the type shown in FIGS. 1 to 5 will be used only with a hole that is already started by some other form of drill bit, but once started in a hole the bit of the present invention will advance accurately throughout the depth of the hole.

Because of the non-clogging nature of the chamber provided for the chips created by the drill bit in the hole it drills it is unnecessary to back the drill bit out periodically to remove packed chips from the passage provided for them by the drill bit. This reduces greatly the time required to drill a hole. Since the chips do not jam, the life of the bit is also materially increased.

It is always desirable that the cutting edge of a drill extend radially outwardly a small distance beyond the normal radial dimension of the drill bit itself, to avoid binding in the hole. Such back taper can be readily provided on the bit of this invention, but it would be too small to depict in any of the figures herein chosen to illustrate the invention. It may also be desirable to provide greater or lesser amounts of clearance for the cutting edge 19. This can be done by grinding the end 12 to a cone shape wherein the axis of the cone is inclined to the axis of the drill bit. Such cone-shaped end is shown, for example, in FIG. 6 at 20, and the conical hole bottom created by the drill bit of FIG. 6 is shown in FIG. 8 at 21. It is also possible by appropriate grinding of surface 16 at the cutting edge 19 to provide positive, neutral, or negative rakes for the cutting edge.

In FIG. 9 is shown a modification which takes into consideration practical limitations of grinding wheels. It is substantially impossible to produce a commercial grinding wheel the face and side of which intersect in a sharp edge. The generally available grinding wheels will produce an inside corner which is rounded rather than square, so that in the drill bits of this invention, the inside corner formed by wall 17 and surface 16 is rounded in the manner of a fillet. If wall 17 at the cutting edge 19 is located at the axis of the bit, the fillet extends a slight distance over the cutting edge 19 and deprives that edge of its cutting ability at the center of the bit. The failure of the center to cut the metal in keeping with the rest of the edge causes the bit to be forced radially outwardly, which then makes the bit bear against the wall of the hole rather than against the bottom. The resulting hole is of greater diameter at its bottom than it is at its top and the desired accuracy of the drilling operation is not achieved. In addition, the side pressure creates an undesirable binding action of the bit in its hole.

The difficulties outlined above may be avoided by making certain that the cutting edge 19 is at least equal to the radius of the drill bit. Thus, as shown in FIG. 9, wall 17' terminates to the right of the axis of the drill bit, and fillet 22, formed by the grinding wheel, is also on this side of the axis in its entirety. This makes edge 19' at least coextensive with the radius of the drill bit as required for accurate drilling of a hole without binding action.

For greater assurance of elimination of binding action, the drill bit of FIG 9 may be relieved on the side opposite cutting edge 19' by grinding a slight flat 23 thereat and then rotating the bit against the grinder at the radius of the flat to produce a circular surface 24 from the point of intersection of flat 23 with the radial extension of edge 19' Any tendency of the bit to bind will be relieved by the clearance provided at the flat 23 and the reduced radius of the surface 24.

It is understood that the foregoing description is merely illustrative of preferred embodiments of this invention and that the scope of the invention therefore is not to be limited thereto but is to be determined by the appended claims.

I claim:

1. A deep hole drill bit having a cutting end, a shank end and a part intermediate said ends, said bit comprising a round rod, portions of which are removed to form with the hole drilled by the bit, a chamber of progressively larger volume from the cutting end thereof toward the shank end, whereby to promote passage of chips from said cutting end to the exterior of the hole, said removed portions comprising a flute extending from the cutting end to the intermediate portion and defined by intersecting continuous flat walls, the line of intersection being disposed at an acute angle with the axis of the bit.

2. A deep hole drill bit as described in claim 1, said continuous walls being flat planes disposed substantially at 90° with respect to one another.

3. A deep hole drill bit as described in claim 1, said cutting end being flat and intersecting one of said walls to form a cutting edge.

4. A deep hole drill bit as described in claim 1, the intersection of one of the walls of the flute with the cutting end of the bit forming a cutting edge, said one of said walls at the cutting edge passing through a diameter of the bit, said bit having a flat on the side thereof opposite the cutting edge which is normal to said diameter, and said bit having a radius from the flat to the other of said walls substantially equal to that radius of the bit which is perpendicular to said flat.

5. A deep hole drill bit as described in claim 4, said other wall intersecting the cutting end of the bit on the side of the bit axis opposite the side on which the cutting edge is formed, whereby said cutting edge extends at least from the axis of the bit to the outer wall thereof.

6. A deep hole drill bit comprising a round rod having a cutting end, a shank and a portion intermediate the cutting end and the shank, said cutting end in radial cross section having a sector removed equal to substantially one-fourth the cross sectional area of said cutting end, and said intermediate portion in radial cross section having a sector removed equal to substantially one-half the cross sectional area of said intermediate portion, said sections being connected by continuous walls to form with the wall of the hole drilled by the bit, a chamber of progressively larger volume from the cutting end thereof toward the shank end, whereby to promote passage of chips from said cutting end to the exterior of the hole.

7. A deep hole drill bit comprising a substantially cylindrical rod having a cutting end, a shank end and an intermediate portion, said rod having a single flute forming with the hole drilled by the bit a chamber of progressively larger volume from the cutting end thereof toward the shank end, whereby to promote passage of chips from said cutting end to the exterior of the hole, said flute extending from the cutting end to the intermediate portion and defined by intersecting walls, one of said walls being disposed substantially parallel with the axis of the rod and the other of said walls intersecting the first-mentioned wall at an acute angle to said axis of the rod.

References Cited by the Examiner

UNITED STATES PATENTS 716,441  12/1902  Latham _____ 77—66 X

FOREIGN PATENTS 612,288  11/1948  Great Britain.

FRANCIS S. HUSAR, *Primary Examiner.*

WILLIAM W. DYER, JR., *Examiner.*